United States Patent [19]

Horvat

[11] 4,165,066

[45] Aug. 21, 1979

[54] APPARATUS FOR ACTIVE REDUCTION OF VERTICAL VIBRATIONS OF A VIBRATING MASS

[76] Inventor: Borut Horvat, Kmetijska 3a, 62000 Maribor, Yugoslavia

[21] Appl. No.: 813,979

[22] Filed: Jul. 8, 1977

[30] Foreign Application Priority Data

Jul. 12, 1976 [YU] Yugoslavia ............................ 1704/76

[51] Int. Cl.$^2$ ............................................. F16F 9/02
[52] U.S. Cl. ................................. 267/65 D; 267/126; 267/DIG. 1; 280/714
[58] Field of Search ................. 267/64 R, 64 B, 65 D, 267/126, 127, 124, DIG. 1; 280/707, 714

[56] References Cited

U.S. PATENT DOCUMENTS

| | | | |
|---|---|---|---|
| 2,977,110 | 3/1961 | Kilgore | 267/65 D X |
| 3,124,368 | 3/1964 | Corley et al. | 280/707 X |
| 3,741,582 | 6/1973 | Eckert | 280/714 |
| 3,807,678 | 4/1974 | Karnopp et al. | 267/126 X |
| 3,941,403 | 3/1976 | Hiruma | 267/65 D X |
| 3,995,883 | 12/1976 | Glaze | 280/707 |

*Primary Examiner*—George E. A. Halvosa

*Attorney, Agent, or Firm*—Fleit & Jacobson

[57] ABSTRACT

With the purpose of attaining effective reduction of vertical vibrations, there is arranged in vertical direction between the vibrating mass and the excitation source one or more little-damped springing systems which include compressed-air springing elements provided with a connecting pipe for the inlet or outlet of compressed air, whereby active intervention in the functioning of base springing systems is made possible. The active intervention concerns the vibrating of the mass in the resonance of the systems, and consequently, these systems may be provided only with the dampers which enable low damping or may be even without dampers at all. Moreover, between the vibrating mass and one or more springing systems, or between the springing systems and the excitation source, there is arranged one or more acceleration transformers in vertical direction. The deformation of each acceleration transformer amplified by the corresponding deflection amplifier opens its main valves, which proportionally to their displacement in the sense of opening thereof, let compressed air flow into the corresponding springing element or out of it into the atmosphere.

6 Claims, 3 Drawing Figures

APPARATUS FOR ACTIVE REDUCTION OF VERTICAL VIBRATIONS OF A VIBRATING MASS

BACKGROUND OF THE INVENTION

This invention relates to an apparatus for active reduction of vertical vibrations of vibrating mass, especially of motor vehicle components, driver and passengers exposed to a non-periodic (random, stochastic) excitation and bound in vertical direction to a base springing joint provided with a compressed-air springing unit having a connection pipe for compressed-air supply and removal.

It is known that at projecting arrangements which are exposed to vibrations, particularly those through which these vibrations are transmitted onto human body, a solution of most effective reduction of harmful vertical vibrations is aimed at. Actually, most of such problems appear in motor vehicles, and therefore the so called pending seats, cabins and the like are to be provided.

Arrangements for reduction of vertical vibrations of motor vehicle elements by additional energy, as known in prior art, are confined to the above structures of traveler's vehicles, whereat hydraulic systems are used. As results of these solutions, very complicated and expensive constructions have been presented, which, just due to the price, have not been accepted for mass production.

On certain vehicles, e.g. buses, the hinging systems based on compressed air are used, the control of which is based on the supply of compressed air into or its removal from the compressed-air springing element. This control is provided for controlling the vehicle level when the loading is changed or unequal, for example, and not capable of reacting quickly, especially to random excitations.

The vibration systems of passive type which have been used hitherto for reducing vertical vibrations are confined to a compromise as regards the choice of the damping factor. This factor being high, the influence of the vibration system resonance is well reduced, but the damped mass is strongly influenced by high frequencies. On the contrary, when said factor is low, the damped mass is less influenced by high frequencies, but at resonance a high extension of amplitude of oscillation appears. Said compromise is always present and the results achievable by applying the alinear elements of the springing system are not considerably better. When a larger mass is in question, e.g. an above structure of traveler's vehicle, this compromise is simultaneously conditioned by driving security which requests as small loading variation on shaftings as possible.

One of the known solutions or reducing vertical vibrations at a seat using passive elements of the springing system is a pending seat construction, which, by the fundamental frequency of the vibrating system of the seat arranged below the fundamental frequency of vibrating system of the vehicle and thereby performing a little smaller excitation as well as considering lower sensibility of human at lower frequencies, registers somewhat better results, but they are unsatisfactory yet.

SUMMARY OF THE INVENTION

This invention aims at the task of avoiding the disadvantages of known constructional solutions. An object of the invention is to avoid compromise in choosing the damping factor, using an active controlling system based on compressed air. Another object of the invention is to embody vibrating systems with very low damping factors, whereat a possibility of the damper being even omitted is given.

Other objects and advantages of the present invention will be apparent in more detail from a description of the preferred embodiment which follows.

The invention is basically characterized in that between the vibrating mass and one or more base springing joints or between said base springing joints and the excitation source, in direction of vertical movements of said mass, one or more acceleration transformers are connected rigidly, still in that a compressed-air springing unit is, by a connection pipe for quick active correction to which two auxiliary valves for mid-position are connected in parallel, enclosed actively in the controlling circuit, the main elements of which being, furthermore, a deflection amplifier and two main valves, whereat said acceleration transformer and said deflection amplifier are mutually mechanically parallelly connected, further, a compressed-air reservoir connected by conduits to the first or second pair of valves, respectively, and thereby also connected to said compressed-air springing unit, and furthermore in that a passive damper is connected parallelly to said compressed-air springing unit. Hereto, as compressed-air springing unit a torus bellows, a cylinder-piston joint or a membrane springing element and the like could be understood, which are characterized by elastic qualities achieved by compressed air in their inside and provided with a connecting pipe for the inlet or removal of said compressed air.

Furtheron, the acceleration transformer consists of an elastic element and a passive damper being parallelly interconnected, and is adjusted in such a way that its fundamental frequency in connection with the vibrating mass is at least some times higher than the fundamental frequency of the base springing unit in connection with the same mass, and the phase angle between the time function of the exciting deflection appearing in vibrating system of the acceleration transformer and said mass on one side and the time function of elastic deformation appearing in the acceleration transformer on the other side, in the range of the fundamental frequency of said base springing joint with the same mass, is as small as possible and does not exceed the extent of about 30°.

The air resistance of said compressed-air springing unit is considerably smaller than the total air resistance of both main valves being entirely opened as well as other conduits and connecting pipes when the air flows from the reservoir via one of said valves into the compressed-air springing unit or from said springing unit via the other valve into the atmosphere, respectively.

In another embodiment of the apparatus according to the invention, when the acceleration transformer is liable to greater elastic deformations and valves are used which at very small displacement enable a reliable large air flow, the acceleration transformer can be connected directly to the inlet of the main valves.

The advantages of the invention proposed consists in the fact that the results of vertical vibration reduction are much better than those achievable by passive systems. The expenditure of energy is small, because a controlling system projected as a band-pass filter expends energy mostly in the frequency range of resonance. In the range of higher frequencies, the reduction of vibration is achievable nearly exclusively by suspending the mass itself, whereat in the range of lower frequencies the mass has to move together with the vehicle. Considering these characteristics as well as the possibility of the apparatus being producible cheaply in mass production, this system is able to react correctly and quickly enough to entirely random excitations. The compressed-air reservoir has to be normally connected to a compressor in the vehicle, which is especially noted neither here nor hereafter. In the case of reducing vertical vibrations of a smaller mass, e.g. a seat with a person in a truck or land-truck, it is possible to utilize the reserve of the reservoir that appertains to the existent compressor without any enlargement thereof.

Other objects and advantages of the present invention as well as theoretical comments will be seen from a description of the preferred embodiment presented by a single drawing described hereinafter.

DESCRIPTION OF THE PREFERRED EMBODIMENT

Figure 1:
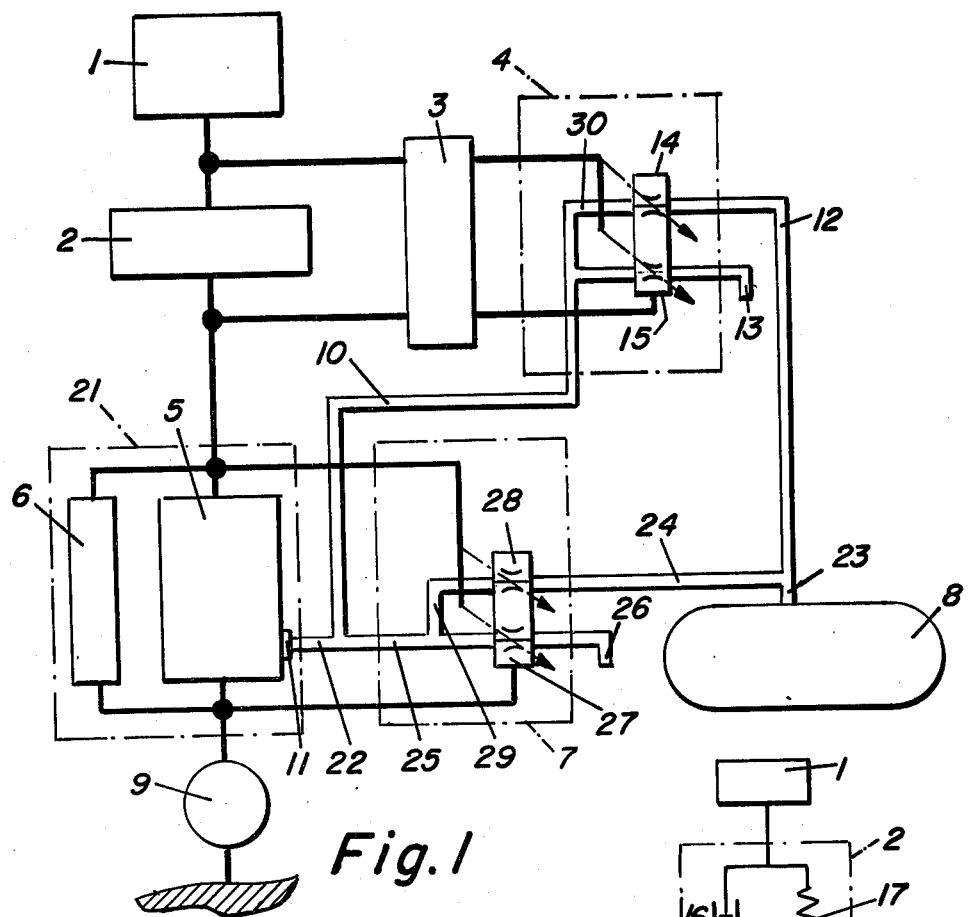
FIG. 1 shows diagrammatically an apparatus according to the invention.

For base springing joint 21 of FIG. 1 there is used compressed-air springing unit 5 of any type, e.g. a torus bellows, a cylinder-piston joint or a membrane springing element which is provided with connecting pipe 11 for inlet or outlet of compressed air. The characterization of springing unit 5 used is not essential for understanding in its passive sense (when connection pipe 11 is closed) and can be alinear or linearized by means of a sufficient reserve volume. Parallel to compressed-air springing unit 5 passive damper 6 is connected, which can be of any type as well, yet there is preferred a slight damping, and furthermore, on the basis of an active damping resulting from the use of additional energy, this damper could be omitted with the results being good enough.

To base springing joint 21 formed, as already said, as a parallel joint of compressed-air springing unit 5 and passive damper 6, in vertical direction vibrating mass 1 is fastened on rigidly by acceleration transformer 2. It must be pointed out that hereinafter only a possibility of acceleration transformer 2 being arranged between mass 1 and springing joint 21 is mentioned, whereas identical results are achievable when said transformer is arranged between springing joint 21 and excitation source 9, because in both cases the same force biasing mass 1 is transmitted over acceleration transformer 2. Mass 1 with base springing joint 21 represents a base passive vibrating system, whereas acceleration transformer 2 is incorporated in this joint already due to the control. With the same purpose there is foreseen connecting pipe 11. Mass 1 (except that part of it that falls to a person) is of course connected rigidly to base spring joint via acceleration transformer 2 only in vertical direction; the localization thereof in other directions is not shown in the drawing, because although it is necessary, it has no influence upon the commentary on the functioning of the apparatus according to the invention.

Figure 2:
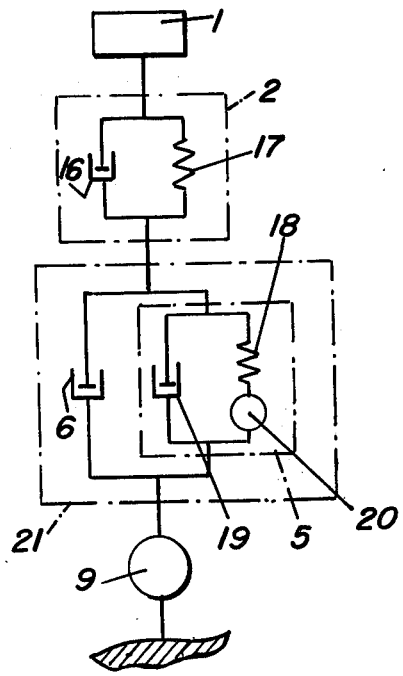
FIG. 2 is a detail drawing of FIG. 1.

The joining of mass 1 and base springing joint 21 by acceleration transformer 2 is presented as an equivalent scheme in FIG. 2. Therefrom it can be seen that the compressed-air springing unit 5 consists of parallel interconnected passive damper 19 and elastic element 18, and furthermore, correction exciter 20 connected to said elastic element in series, whereat said exciter exists on the ground of the fact that by additional inlet or outlet of compressed air it is possible to influence base springing joint 21 correctively in such a way that excitation caused by the unevenness of the road or the land and diagrammatically displayed in FIG. 2 as excitation source 9 influences base springing joint 21 by other elements of the vehicle.

The basic object of the invention being the reduction of vibrations of mass 1 for random excitations, it is necessary for the controlling arrangement to influence compressed-air springing unit 5 quickly and without any greater displacement of phase angle in the zone of the fundamental frequency of base springing joint 21 with mass 1 but in the opposite direction to the influence of the excitation source 9. Good results are to be expected only under this condition. On the basis of said conditional feature, there is provided acceleration transformer 2 which is represented as a springing joint composed of elastic element 17 and damper 16, the fundamental frequency of which in association with mass 1, lies high above the fundamental frequency of base springing joint 21 with the same mass of the construction. The change of elastic deformation of acceleration transformer 2 as a result of vibrating is, when said condition is fulfilled, i.e. the fundamental frequency being considerably higher and damper 16 enabling low damping, very well proportional to the change of force which affects mass 1 absolutely to the ground, and consequently it is proportional to the change of the acceleration of mass 1 wth respect to the ground, too. Accordingly, the elastic deformation of acceleration transformer 2 precedes the deflection of mass 1 for 180°, with the phase angle between the absolute deflection of mass (1) with regard to the surroundings and the deformation of acceleration transformer (2) having a value deflected from 180° by not more than 30°.

As known from the theory of vibrating systems, the deflection of vibrating mass, when observing the resonance frequency of vibrating system, remains behind the deflection of exciting vibration for about 90° (in case without damping exactly 90°), which means that the elastic deformation of acceleration transformer, 2, in case of fundamental frequency of base springing joint 21 and mass 1, precedes the excitation produced by land and vehicle or the excitation from the excitation source 9, respectively, for about 90°. As a result of using acceleration transformer 2, there exists a reserve of about 90° to the active controlled excitation of compressed-air springing unit 5.

The elastic deformation of acceleration transformer 2 being relatively small has to be increased up to a stroke being great enough for main valves 14, 15 of valve joint 4 to be opened. Said increasing could be performed by any type of deflection amplifier 3, and in a special construction, said amplifier could be even released. The alteration of deflection from the central position in one and other direction at the inlet (place) of valve joint 4, said alteration being great enough, is changed, by valves 14 and 15, in the alteration of compressed-air flow in one direction from air reservoir 8 via conduits 23, 12, valve 14, conduits 30, 10, 22 and connecting pipe 11 into springing unit 5, and in the other direction from compressed-air springing unit 5 via connecting pipe 11, conduits 22, 10, valve 15 and conduit 13 into the atmosphere. Obviously, it is necessary for the alteration of compressed-air flow, according to the physical rule, to be proportional (best, if linear proportional) to the alteration of deflection at the inlet of valve joint 4 or the outlet of deflection amplifier 3, respectively. Consequently, valves 14 and 15 have to be used, the alterable throttling of which is achieved by a relative movement thereof. As illustrated in FIG. 1, the valves 14 and 15 are mechanically coupled in parallel so that one of the valves is opened and one of the valves is closed by movement of the deflection amplifier 3.

A special embodiment of the apparatus can be realized by valves the functioning of which is entirely digital, i.e. the valves are closed till a certain movement thereof and are completely opened when said movement is greater.

The resistance of compressed air in the recesses of valves 14 and 15 as well as partly the resistance in said conduits being great enough, it is not difficult to fulfil the condition that the compressed-air resistance of the valves and conduits is several times greater than that of springing unit 5, and thereby a condition of integration is fulfilled automatically. Due to the compressed-air stream in or off, the corrective deflection of excitation of springing unit 5 remains, through phase, behind the alteration of air flow for 90°, which is a known feature of any integration.

Thereby, the deflection of controlling excitation of springing unit 5 is approximately in-phase with the excitation of excitation source 9, but it acts, if correctly connected, by valves 14 and 15 in opposite direction, whereby at resonance frequency, on principle, effective reduction of vibrating mass 1 is made possible. At realization, there is to consider the alinearity of elements, thermodynamic properties as well as features of behaviour of vibrating systems, which all could cause an additional phase displacement, whereat the amplitude could be, in case of fundamental frequency of base springing joint 21 with mass 1, adjusted by the reinforcement of regulating system on the basis of using compressed-air of higher pressure, the air resistance of valves and the like. In the zone of frequency above the resonance of base springing joint 21 with mass 1 arises the following situation. The deflection of mass 1 remains behind the excitation deflection of excitation source 9 for more than 90° and the phase angle increases from 90° to 180° with the increasing frequency. Consequently, the elastic deformation of acceleration transformer 2 precedes the deflection of excitation of source 9 for less than 90° and the phase angle is lowering from 90° to 0° at increasing frequency. Although the integration of compressed-air flow in springing unit 5 is normally performed through the displacement of phase angle for about 90° in the sense of remaining behind, the exciting deflection achieved through correction exciter 20 is no more in the opposite sense of functioning in phase with the exciting deflection of excitation source 9, and therefore the influence of control is lowering with the increasing of the frequency. Simultaneously, the amplitude of controlling excitation is lowering, too, because it depends upon the characteristic curve of the reinforcement of base springing joint 21 with mass 1 which is rapidly lowering with the increasing of the frequency over the resonance one. There appears a negative influence of the feature of the amplitude of accelerating mass 1, which is proportional to the square of frequency, but this influence is weakened again, because the amplitude is lowering linearly with the increasing frequency at the integration owing to the air-flow into and out of springing unit 5. The influences as mentioned above act in the sense of reducing the control effect at frequencies lying higher than the resonance one, and besides, the base controlling system requires less energy at these frequencies. For vibrations of mass 1 at these frequencies it could be confirmed that the reducing thereof, having used passive damper 6 with a low damping, is achieved mostly passively by suspending the mass as such. Consequently, there is provided a frequency filter which demands less energy, whereat there is no need for much quicker functioning of the controlling system at higher frequencies, which all represents an important advantage of the present invention.

In the zone of frequencies below the fundamental frequency of base springing joint 21 with mass 1 there exists the following situation. The deflection of vibrating mass 1 remains behind the deflection of excitation source 9 for less than 90°, and the phase angle proceeds from 90° to 0° when the frequency is lowering. Therefore, the elastic deformation of acceleration transformer 2 precedes the deflection of excitation source 9 for more than 90°, and the phase angle proceeds from 90° to 180° when the frequency is lowered. Although the integration of air-flow in the air cylinder is again performed normally, i.e. by the displacement of the phase angle for about 90° in the sense of remaining behind, the deflection of correction exciter 20 is no more in the opposite sense of functioning in-phase with the deflection of excitation source 9, as this has happened at the fundamental frequency of base springing joint 21 with mass 1, and therefore the influence of control is lowering together with lowering frequencies. Simultaneously, there is lowering the amplitude of correction excitation, because it depends on the characteristic property of base springing joint 21 with mass 1 which is rapidly lowering with the frequency being lowered below the resonance one. Said amplitude is lowering also due to the acceleration of mass 1, the amplitude lowering of which is occuring together with the lowering of frequency proportionally to the square of the frequency, while linear increasing of the amplitude occuring through the lowering of frequency on the basis of integration due to the air-flow into and out of compressed-air springing unit 5 has a harmful influence. Consequently, at the frequencies lower than the resonance one there comes to rapid reduction of control as well as energy expenses, and base springing joint 21 with mass 1 acts like a passive one, which means that the amplitude of mass 1 is, through the lowering of frequency, approaching the amplitude of excitation source 9. It is of course necessary because mass 1, which in fact is the total part of the vehicle, has to move with the vehicle when very low frequencies of excitation are in question, e.g. when the vehicle is driven over a land.

For springing unit 5 there has to be defined central position because of small asymetry of functioning. In an opposite case, there could appear a displacement of said position, which could lead to an abnormal regime of functioning. In consequence of this, there is provided an auxiliary organ, mid-position controller 7, which according to the momentary state of springing unit 5, with air resistance being very high, slowly fills or empties said unit 5. Said filling or emptying represents a permanent waste of energy which can be very small, and therefore does not influence the functioning at frequencies in the zone of fundamental frequencies of base springing joint 21 with mass 1. Therefore, valves 28 and 27 of mid-position controller 7 are closed at the central position of springing unit 5, and after the displacement from said central position in one direction, there is opened the compressed air inlet which flows from reservoir 8 via conduits 23 and 24, then via valve 28, conduits 29, 25, 22 and connecting pipe 11 into springing unit 5, and after the displacement in the other direction, the air is let out of the springing unit 5, wherefrom it flows via conduits 22 and 25, valve 27 and conduit 26 into the atmosphere. The valves 27 and 28 can be of any type, and there is not required a continual opening in relation to the deflection of vibration, yet it suffices for valve 28 or 27 to be completely opened when springing unit 5 is somewhat displaced from its central position. Considering the energy saving, there is possible to determine a zone for the central position of controller 7, whereat valves 28 and 27 are opened in one or the other direction, yet out of said zone.

Considering the physical properties of compressed-air springing unit 5, it is evident that it does not behave in the same manner when excited mechanically by excitation source 9 or actively by the inlet and outlet of the compressed air through connecting pipe 11, which is represented by correction exciter 20. The behaviour of compressed-air springing unit 5 regarding said different manners of excitation is very much alike. The difference is lowering in the sense of lowering the damping by passive damper 6, and said differences disappear when the mentioned damper 6 is not included therein. In practical embodiments, when damper 6 of low damping is provided, said feature has no influence on the functioning of the apparatus according to the invention.

Figure 3:
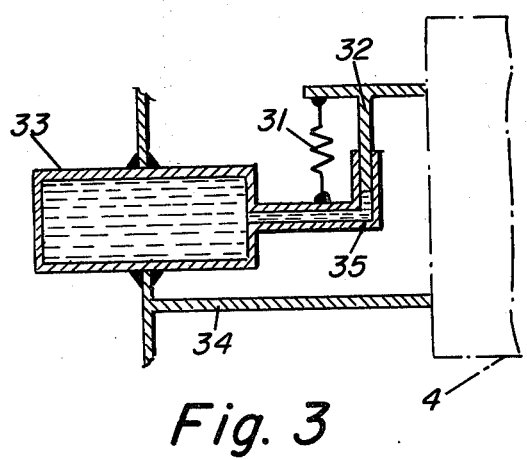
FIG. 3 is an embodiment of the acceleration transformer and the deflection amplifier in a cross-sectional view.

A special embodiment of acceleration transformer 2 with deflection amplifier 3 is shown as an example in FIG. 3. As elastic element 17 there is provided a screen 33 of any design and of thin walls filled with a non-compressible fluid, which at elastic deformation of screen 33 influences plunger 32 by tube-shaped cylinder 35. Consequently, cylinder 35 as such operates as damper 16, whereas by changing the cross-section of screen 33 to the cross-section of cylinder 35 there is achieved an increasing of the plunger stroke and thereby deflection amplifier 3 is performed. The output of deflection amplifier 3 lies accordingly between plunger 32 and connection part 34.

Plunger 32 does not react or else it reacts very little when very low frequencies of the screen deformations or a static deformation thereof are in question, because of the diameter of the tube-shaped cylinder being a little larger than the diameter of plunger 32, and so the liquid can penetrate between plunger 32 and cylinder 35. Thereby it is possible to adjust the apparatus to different values of mass 1, whereas spring 31 arranged parallel to the inlet of valve joint 4 serves for preserving the central position of plunger 32 with respect to cylinder 35. In general, for automatic adjustment of the controlling system to different values of mass 1, there is necessary, at the outlet point of acceleration transformer 2, to put a damper in series with the inlet of deflection amplifier 3 or in series with the inlet of valve joint 4, whereas parallel to the inlet of deflection amplifier 3 or parallel to the inlet of valve joint 4 there is necessary to put an elastic element enabling returning movement into the defined central position of the inlet.

Mid-position controller 7 represents beside the properties already mentioned also automatic adjustment of the central position of mass 1 for different masses, e.g. a seat with drivers.

What I claim is:

1. An apparatus using compressed air for active reduction of vertical vibrations of a mass exposed to a source of random vertical excitations comprising:
a base springing joint positioned between said mass and the source of excitations and including a compressed air springing unit, conduit means having a single pipe connected to said compressed air springing unit for connecting said compressed air springing unit to a source of compressed air and the atmosphere, and a passive damper connected in parallel with said compressed air springing unit;
actuating means responsive to vertical excitations for actuating said compressed air springing unit to reduce the vertical vibrations of the mass and including sensing means positioned in vertical alignment with said base springing joint for sensing vertical excitations, amplification means mechanically connected with said sensing means for amplifying sensed excitations, and first valve means positioned between the source of compressed air and said conduit means of said base springing joint and responsive to said amplification means for selectively connecting the single pipe of said conduit means to the source of compressed air and to the atmosphere so that said compressed air springing unit actively damps sensed vertical excitations; and
second valve means positioned between the source of compressed air and said conduit means and responsive to a static load on said compressed air springing unit for selectively connecting the single pipe of said conduit means to the source of compressed air and the atmosphere so that said compressed air springing unit automatically adjusts for different static loads.

2. Apparatus for active reduction of non-periodic vertical vibrations of a mass (1), especially a mass such as motor vehicle components, driver, and passengers, the mass being supported by a passive pneumatic springing system exposed to a source of non-periodic excitations (9), the passive pneumatic springing system including a base springing joint (21) connectable to a source of compressed air (8) and having: a passive damper (6), a compressed air springing unit (5) having a movable member and a connecting pipe (11) for selectively connecting the springing unit to the atmosphere and the source of compressed air, and level control means responsive to a static load on said springing joint for automatically controlling said compressed air springing unit and thereby adjusting the position of said movable member, the level control means including first conduit means (22, 25, 29, 24, 23) for connecting the connecting pipe to the source of compressed air, second conduit means (22, 25, 26) for connecting the connecting pipe to the atmosphere, and valve means (27, 28) for controlling the connection of said first and said second conduit means to said connecting pipe, said apparatus comprising:
an acceleration transformer (2) interconnected between the mass (1) and the base springing joint (21) or between the base springing joint (21) and the source of non-periodic excitations (9) for sensing the excitations;
a deflection amplifier (3) having an inlet mechanically coupled with the acceleration transformer (2) and an outlet;
a valve joint (4) having a first valve (14) and a second valve (15) mechanically connected in parallel to the outlet of the deflection amplifier (3) so that only one of the two valves is opened when the acceleration transformer (2) is subject to an excitation in one direction and only the other of the two valves is opened when the acceleration transformer (2) is subject to an excitation in a direction opposite said one direction;

third conduit means (23, 12, 30, 10, 22) controlled by a first of said two valves for connecting the connecting pipe to the source of compressed air; and fourth conduit means (13, 10, 22) controlled by a second of said two valves for connecting the connecting pipe to the atmosphere.

3. Apparatus according to claim 2, characterized in that the air resistance of the springing unit (5) is at least one hundred times lower than the total air resistance of the completely opened valves (14, 15) and other conduits and connections, when the air flows into the springing unit (5) from the reservoir (8) via the first valve (14), and when it flows from the springing unit (5) via the second valve (15) into the atmosphere.

4. Apparatus according to claim 2, characterized by the acceleration transformer (2) being directly connected to the inlet of said first and said second valves (14, 15), when greater elastic deformations thereof are expected and when the valves (14, 15) enable sufficient flow of compressed air at very small movements of said valves.

5. Apparatus according to claim 2, wherein the acceleration transformer (2) includes an elastic element (17) and damper (16) connected in parallel.

6. An apparatus according to claim 5, wherein the characteristics of the elastic element and damper are chosen for control of pneumatic damping of resonance of the base springing unit (21) with the mass (1) so that the acceleration transformer (2) with the mass (1) has a fundamental frequency at least several times higher than a fundamental frequency of the base springing joint (21) with the mass (1) and, in case of the resonance of the base springing joint (21) with the mass (1), a temporal phase angle between the absolute deflection of the mass (1) with regard to the surroundings and the deformation of the acceleration transformer (2) being closest to 180°, whereat the phase angle has a value deflected from 180° by not more than 30°.

* * * * *